Sept. 23, 1941.  A. ALFORD  2,256,539
ALTIMETER
Filed Oct. 19, 1939  2 Sheets-Sheet 1
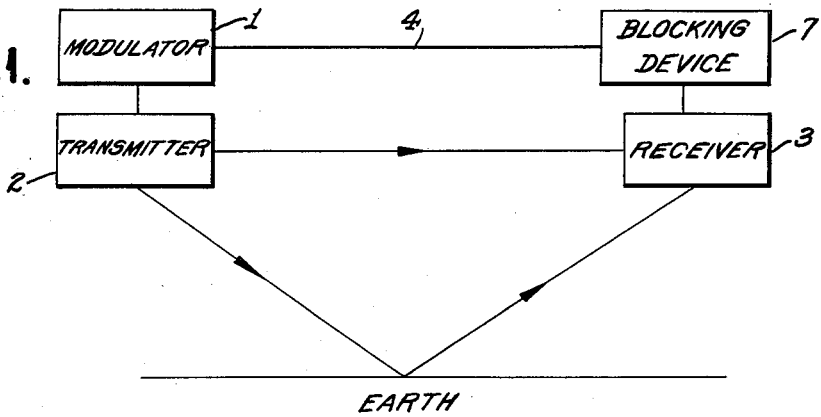
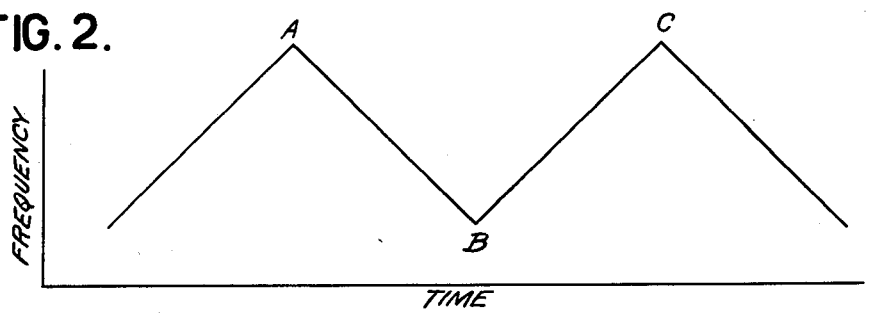
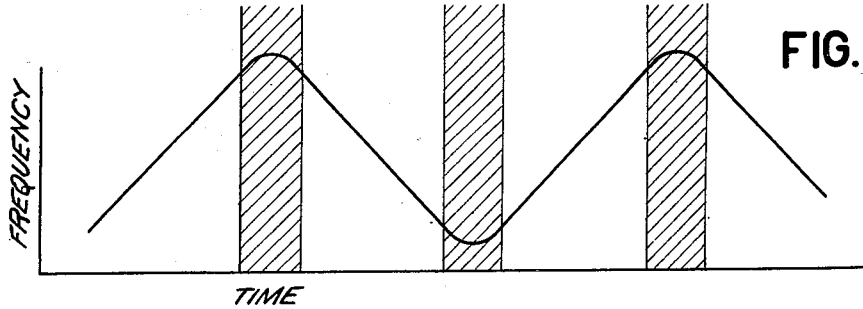
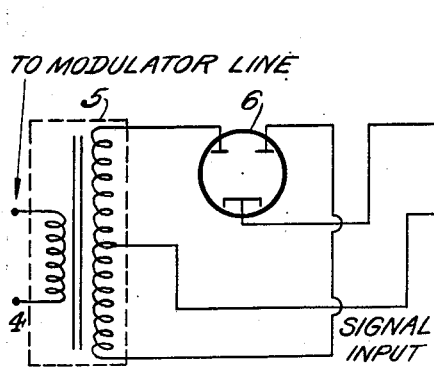
INVENTOR
ANDREW ALFORD
BY
ATTORNEY

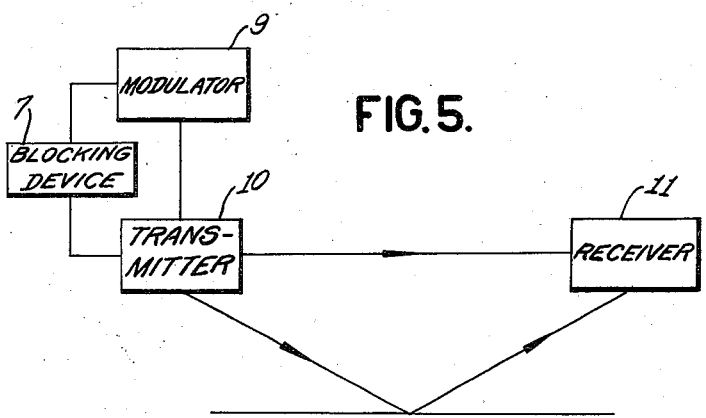
FIG. 5.
FIG. 6.
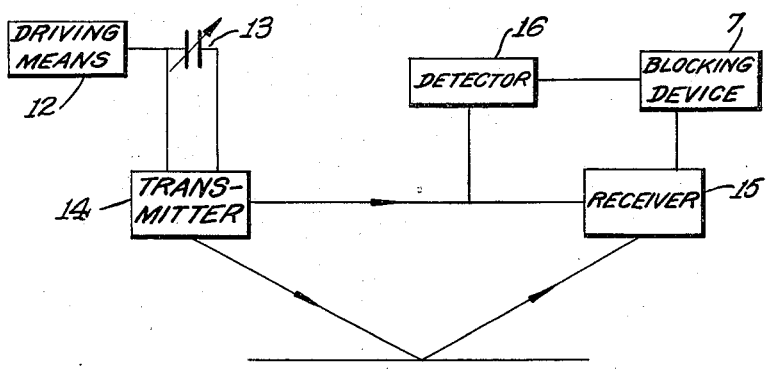
FIG. 7.
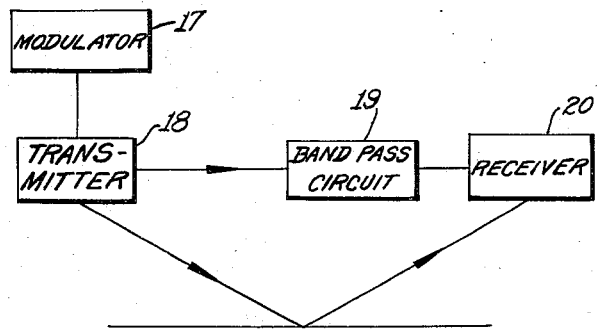
INVENTOR
ANDREW ALFORD
BY
ATTORNEY Patented Sept. 23, 1941

2,256,539

UNITED STATES PATENT OFFICE 2,256,539

ALTIMETER

Andrew Alford, New York, N. Y., assignor to Mackay Radio and Telegraph Company, New York, N. Y., a corporation of Delaware Application October 19, 1939, Serial No. 300,165

7 Claims. (Cl. 250—1)

My invention relates to the art of measuring distances by means of electromagnetic waves, and more specifically to an improved method of modulation and detection.

An object of my invention is to produce a method of and means for obtaining a direct ratio between frequency and distance.

In a type of absolute altimeter utilizing the heterodyne action between the directly transmitted and reflected electromagnetic wave signals, it is desirable to make the beat frequency a straight line function of the altitude. For this to be true the frequency of the transmitter must vary at a constant rate over its operating range which in turn requires modulation of saw-tooth wave form. Saw-tooth frequency modulation, however, is a difficult thing to produce, the turning points commonly being rounded with the result that an incorrect beat frequency is recorded on the altimeter (hence incorrect altitude determination). To prevent this error the present invention provides a method of eliminating the signals that produce the incorrect readings.

The attached drawings serve to more clearly illustrate the present invention wherein:

Fig. 1 is a diagrammatic view of a representative use of the invention;

Fig. 2 is a graph of frequency versus time showing ideal frequency modulation;

Fig. 3 is another graph of frequency versus time showing practical frequency modulation;

Fig. 4 is an arrangement for making one or more receiver stages inoperative during certain portions of the modulating signal period;

Fig. 5 is an arrangement for making one or more transmitter stages inoperative during certain portions of the modulating signal period;

Figs. 6 and 7 are arrangements for making one or more transmitter or receiver stages inoperative during certain portions of the signal period.

In Fig. 1 is shown a system of height determination used on aircraft comprising a modulator 1, transmitter 2, and receiver 3 having a line 4 for feeding some of the modulation output directly to the blocking device 7 which is explained in connection with Fig. 4. Modulator 1 causes a substantially uniform cyclic increase and decrease in the frequency of energy transmitted from transmitter 2 between predetermined limits. The energy transmitted 2 downwardly is reflected at the earth's surface and received in receiver 3. Simultaneously, some of the modulated energy is directly transmitted to receiver 3, a comparison of the energy directly received and received after reflection being used to determine the height above the reflecting surface in a known manner.

Fig. 2 illustrates the relation that must be true between the frequency of the transmitter and time if a single beat frequency is to be the indication of a given distance. If the wave form produced by modulator 1 were a straight line curve at all points no further apparatus would be required. However, in practice such a straight line curve cannot be practically achieved, the wave form being such that the points A, B and C, at which the frequencies change from ascending to descending values, being rounded, so that distortions and consequent inaccuracies in altitude indications result.

Fig. 3 is a graph of frequency modulation which is easily produced. The peaks or sections where the frequency changes direction are rounded and occupy a small interval of the total frequency range. Joining these rounded sections are straight portions that are required for a correct relation between frequency and distance. If reception of the curved sections enclosed by the shaded areas can be eliminated, a single beat frequency will be received for a given distance.

This can be done very simply by feeding some of the modulating signal over line 4 into the receiver, as is shown in Fig. 4. Since the rate of change of the modulating signal is least during such times, this signal, if passed through a transformer 5, would result in least voltage on the secondary provided the impedance of the transformer is low with respect to the input and output circuits or the coupling between the two windings is low. The secondary voltage may then be rectified in full-wave fashion by rectifier 6 and imposed on one of the receiver stages 8 in such a manner as to make the receiver stage operative during the time when the transmitter frequency is varying at a rate determined by the straight line portion of the frequency-time curve.

If the transformer coupling is high and the impedances of the input and output are low with respect to the transformer impedance, then the secondary voltage will be a maximum when the primary voltage is a maximum. The secondary voltage rectified will give a maximum D. C. voltage at each maximum and minimum point of the modulator voltage. This D. C. voltage may be used at its maximum values for blocking a receiver stage by applying a negative potential to the grid of a tube of this stage.

In a similar manner the output of the modulator 9 in conjunction with blocking device of Fig. 5 could be used to block a stage of the transmitter 10, such as, for example, an amplifier stage, so that radiation from the transmitter will ensue only during the time that there is a constant rate of change of frequency. These radiations are picked up by receiver 11.

A further development of this method is shown in Fig. 6. In the event that the transmitter 14 is modulated by varying an element in the oscillator circuit, as by means of a driving mechanism 12 and a variable condenser 13, the transmitted signal may be passed through a detector 16 that will convert frequency modulation to amplitude modulation and may be employed to operate the blocking device 7 connected to the receiver 15.

A further development of this method would be the use of a band pass circuit in said transmitter or in said receiver or both so designed as to suppress all frequencies above and below the frequencies that give accurate distance indications.

This circuit may be either a band pass filter or a tube stage designed to pass a band of frequencies. An embodiment of this invention is shown in Fig. 7 wherein modulator 17 varies the frequency of transmitter 18 between certain limits. A band pass circuit 19 may be adjusted so as to suppress the upper and lower frequencies of the transmitter, the frequencies which usually give incorrect indications. Circuit 19 may be either a part of the transmitter or receiver 20, or both, or may be connected externally.

Since by this method it is possible to eliminate undesired portions of signals, it is evident that the modulation requirements are not as rigid.

It is to be understood that the operation of this system is not restricted to aircraft altimeters but may be extended to any arrangement for the measurement of distance by electromagnetic waves.

While I have described particular embodiments of my invention for purposes of illustration, it will be understood that various modifications and adaptations thereof may be made within the spirit of the invention as set forth in the appended claims.

What is claimed is:

1. An arrangement for measuring distance by electromagnetic waves, comprising transmitter equipment for transmitting waves to a distant object, a modulator for periodically varying the frequency of said transmitter equipment over a predetermined range, said frequency varying at a constant rate over most of said range and at a varying rate over a portion of the range, receiver equipment for receiving waves directly from said transmitter equipment and waves reflected from said distant object, and means for rendering one of said equipments inoperative over said portion of the transmitter equipment frequency of varying range.

2. An arrangement for measuring distance by electromagnetic waves, comprising a transmitter for transmitting waves to a distant object, a modulator for periodically varying the frequency of said transmitter arrangement, said frequency varying at a substantially constant rate over most of said range and at a varying rate over the remaining portion of said range, a receiver for receiving waves directly from said transmitter and waves reflected from said distant object, and means under the control of energy from said transmitter arrangement for rendering said arrangement inoperative during said portions of the transmitter arrangement period in which the frequency varies other than at said substantially constant rate.

3. An arrangement for measuring distance by electromagnetic waves, comprising a transmitter equipment for transmitting waves to a distant object, a modulator for periodically varying the frequency of said transmitter equipment, said frequency varying at a substantially constant rate over most of said range and at a varying rate over the remaining portion of said range, a receiver equipment for receiving waves directly from said transmitter and waves reflected from said distant object, and means under the control of energy from said modulator for rendering one of said equipments inoperative during said portions of the transmitter period in which the frequency varies other than at said substantially constant rate.

4. An arrangement for measuring distance by electromagnetic waves, comprising a transmitter arrangement for transmitting waves to a distant object, a modulator for periodically varying the frequency of said transmitter arrangement, said frequency varying at a substantially constant rate over most of said range and at a varying rate over the remaining portion of said range, a receiver arrangement for receiving waves directly from said transmitter and waves reflected from said distant object, means for detecting the difference in frequency between said waves first mentioned and second mentioned, and a band pass circuit for rendering one of said arrangements inoperative during said portions of the transmitter periods in which the frequency of the transmitted waves varies other than said substantially constant rate.

5. An arrangement for measuring distance by electromagnetic waves, comprising a transmitter for transmitting waves to a distant object, a modulator for periodically varying the frequency of said transmitter at a predetermined rate over most of its range, a receiver for receiving waves directly from said transmitter and waves reflected from said distant object, means for detecting the difference in frequency between said waves first mentioned and second mentioned, and a band pass circuit for eliminating a portion of the detected frequency band corresponding to periods in which the frequency of the transmitted waves varies other than at a predetermined rate.

6. An arrangement for measuring distance by electromagnetic waves, comprising a transmitter for transmitting waves to a distant object, a modulator for periodically varying the frequency of said transmitter, a voltage responsive device connected to said modulator, a receiver for receiving waves directly from said transmitter and waves reflected from said distant object and having a plurality of stages, and means for rendering said receiver operative and inoperative comprising a transformer having a primary and secondary, said primary being connected to said voltage responsive device, a rectifier connected to said secondary, a voltage divider in series with said rectifier and said secondary, and means for connecting said voltage divider to a stage of said receiver.

7. An arrangement for measuring distance by electromagnetic waves, comprising a transmitter for transmitting waves to a distant object and having a plurality of stages, a modulator for periodically varying the frequency of said transmitter, a voltage responsive device connected to said modulator, a receiver for receiving waves directly from said transmitter and waves which are reflected from said distant object, and means for rendering said transmitter operative and inoperative comprising a transformer having a primary and a secondary, said primary being connected to said voltage responsive device, a rectifier connected to said secondary, a voltage divider in series with said rectifier in said secondary, and means for connecting said voltage divider to a stage of said transmitter.

ANDREW ALFORD.